United States Patent

[11] 3,551,657

| [72] | Inventor | Philip R. Darrington<br>Staincross, Near Barnsley, England |
|---|---|---|
| [21] | Appl. No. | 674,609 |
| [22] | Filed | Oct. 11, 1967 |
| [45] | Patented | Dec. 29, 1970 |
| [73] | Assignee | Ashworth Ross & Company Limited<br>Midland Iron Works, Scout Hill, Dewsbury,<br>Yorkshire, England<br>a British company |
| [32] | Priority | Nov. 23, 1966 |
| [33] | | Great Britain |
| [31] | | No. 52406/66 |

[54] COUNTING
3 Claims, 1 Drawing Fig.

[52] U.S. Cl...................................................235/151.33,
235/92
[51] Int. Cl.......................................................G06m 3/04,
H03k 23/00, G01g 23/37
[50] Field of Search..........................................235/151.33,
92, 132E, 150.3, 196

[56] References Cited
UNITED STATES PATENTS

| 2,926,848 | /1960 | Gordon | 235/150.3X |
| 3,006,549 | /1961 | Hughes | 235/132EX |
| 3,447,906 | /1969 | Zimmerli | 222/77X |

*Primary Examiner*—Malcolm A. Morrison
*Assistant Examiner*—Edward J. Wise
*Attorney*—Norris & Bateman

ABSTRACT: First and second counters of a counting system are connected to be indicative respectively of the weight of a known number of components to be counted and a batch of such components. A third counter receiving pulses from a pulse generator is connected to be cyclically reversible upon coincidence with the first counter, and these reversals are indicated on a display device. A fourth counter also receiving pulses from the pulse generator is connected to cut off the supply of pulses from the pulse generator and therefore stop the counting indicated at the display device when it reaches coincidence with the second counter.

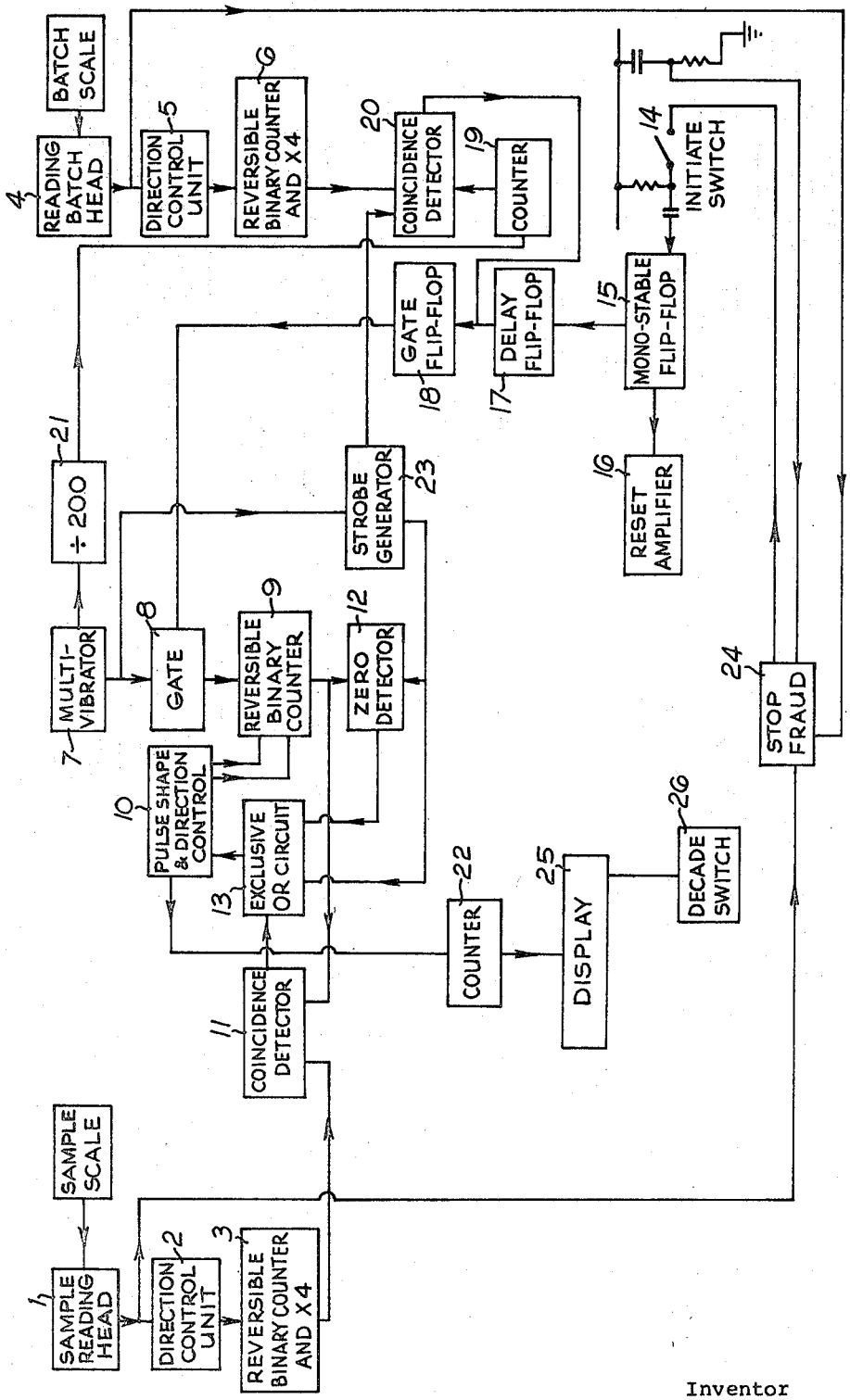

COUNTING

It is an object of the invention to provide a counting apparatus which is comparatively simple to produce and yet is convenient in use.

According to one aspect of the present invention apparatus for counting components comprises means for producing electrically represented digital signals indicative of the weight of a known number of sample components and means for providing similar electrically represented digital signals indicative of the weight of a batch of components, a pulse generator, a first counting circuit for counting a number of pulses related to the sample weight and thereafter resetting to commence a further counting cycle, a second counting circuit giving a signal after a total number of pulses related to the batch weight has been counted, each of said first and second counting circuits including a reversible counter, a third counting circuit for counting the number of cycles undergone by the first counting circuit before receipt of a signal from the second counting circuit so as to provide an indication of the ratio between the batch weight and the sample weight.

In one form of the invention apparatus for counting components by weight comprises a pair of pulse generating means each comprising a radial diffraction grating rotatable relative to an index grating, a light source adapted to impinge a beam of light upon said gratings and a photoelectric reading head adapted to sense resultant interference pattern, the first means serving to provide digital signals indicative of the weight of a known number of sample components and the second means serving to provide digital signals indicative of the weight of a batch of components.

Two dial scales are employed—a 1 pound capacity scale to weigh the sample and a 600 pound capacity machine (with tare bar) to weigh the batch. Each spindle is fitted with a radial diffraction grating, crossed index grating and photoelectric reading head, the sample head and batch head being indicated in the drawing by numerals 1 and 4 respectively. The grating on the sample head has 200 lines, while the batch head grating is inscribed with 600 lines over the arc corresponding to full-scale deflection of the pointer.

Two wave trains 90° out of phase are produced from each head and are logically combined in control units 2 and 5 respectively. Each control unit provides signal pulses and direction control for respective reversible pure binary counters 3 and 6, and also multiplies the number of pulses produced by the movement of the diffraction gratings by 4, giving 800 pulses from head 1 and 2,400 pulses from head 4. Increments of weight recognized by the control units are therefore 0.025 ounces from the sample scale and 4 ounces from the batch scale.

A 50 kHz multivibrator 7 feeds pulses via a gate 8 to a pure binary reversible counter 9 whose direction control is provided by 10. Counters 3 and 9 feed a common coincidence detector 11 which emits a pulse when the contents of the two counters are the same. Counter 9 also feeds a zero detector 12 which emits a pulse when counter 9 is at zero. Both these pulses are applied to the pulse shaper 10 via an exclusive 'OR' circuit 13 which prevents operation when both counters are at zero.

In operation, the batch of articles and a sample from it are placed on the two scales. The spindles revolve and when equilibrium is reached, counters 3 and 6 contain numbers representative of the two weights.

On depressing the "INITIATE" switch 14, a pulse is applied to a monostable flip-flop 15, which fires and feeds a pulse to reset amplifier 16 and also to the delay flip-flop 17. The output of 16 resets all relevant circuits to a state where computing may start. The delay flip-flop introduces sufficient time delay for resetting to take place and circuits to settle before computing begins. The output from flip-flop 17 triggers gate flip-flop 18 which opens gate 8.

The pulses from the oscillator 7 are now applied to counter 9 and via a 200-divider-circuit 2 to counter 19. (The divider circuit is necessary to take account of the 200::1 ratio of weight increments on the two scales.)

Counter 9, which has been directed to count forwards by 10 counts until it reaches the same state as counter 3, when the coincidence detector 11 emits a pulse. This pulse is applied to direction control 10 which causes it to change over, and counter 9 then counts in reverse. It continues to do so until it reaches zero, when zero detector 12 feeds a pulse to direction control 10 which again causes 9 to change direction and count up towards coincidence. During this time counter 19 is counting up towards coincidence with counter 6. Each time 10 changes over the direction of count, a pulse is fed to counter 22 which is provided with a display 25.

The process continues until counter 19 reaches coincidence with counter 6, when coincidence detector 20 emits a pulse which retriggers gate flip-flop 18. This closes gate 8 which stops the computing process. The number now displayed indicates the number of times the contents of counter 3 can be divided into the contents of counter 6 multiplied by 200, i.e. the number of items in the batch.

A strobe generator 23 is used to avoid spurious outputs from zero and coincidence detectors due to counter propagation time and also to prevent a spurious computing cycle being initiated when there are not pulses in counter 6.

A stop-fraud circuit 24 prevents operation of the 'INITIATE' switch 14 when either of the two scales are moving.

If the samples are very small or are not constant, it is of advantage to use 10 items, in which case and extra nought is added to the display by means of an X1—X10 switch 26.

The sample weight may be set up by switches or punched cards if weights are already known.

Whilst in the above embodiment diffraction gratings are used to produce wave-trains in response to applied weights it will be apparent that alternative means can be employed if desired, such as a shaft encoder which is used in association with an appropriate decoder. The sample weight can, of course, be set up without using a scale, e.g. a series of switches or a punch card system may be employed.

It will be appreciated that the above-described counting means affords an extremely simple and convenient way of comparing sample weights and batch weights. The use of reversible counters is particularly advantageous in that the resultant counting can be achieved in a shorter space of time which enables the through put of the counter to be increased. Furthermore the use of diffraction grating signal producing means enables a much simplified circuit design to be achieved.

I claim:

1. Apparatus for counting components comprising means for producing electrically represented first digital signals indicative of the weight of a known number of sample components, a first control means receiving said first signals and producing corresponding pulses, a first counter connected to receive said pulses from the first control means, means for producing electrically represented second digital signals indicative of the weight of a batch of said components, a second control means receiving said second signals and producing corresponding pulses, a second counter connected to receive said pulses from the second control means, a pulse generator, means connecting said pulse generator to a third reversible counter, means connected to said first and third counters for detecting coincidence therebetween and producing a signal operative to reverse the direction of said third counter, means for detecting when said third counter has returned to zero and producing a signal operative to again reverse said third counter, a fourth counter connected to said second counter and said pulse generator, indicator means responsive to the number of reversals of said third counter, and means connected to said second and fourth counters for discontinuing the supply of pulses from said pulse generator to stop the counting operation in said apparatus.

2. The apparatus defined in claim 1, wherein both said first and second counters are reversible.

3. The apparatus defined in claim 1, wherein said indicating means comprises a counter connected to a visual display device.